United States Patent
Ikeda (10) Patent No.: US 10,509,835 B2
(45) Date of Patent: Dec. 17, 2019

(54) RETRIEVAL METHOD, RETRIEVAL APPARATUS, AND NON-TRANSITORY RECORDING MEDIUM STORING RETRIEVAL PROGRAM RECORDED THEREIN

(71) Applicant: FUJITSU LIMITED, Kawasaki-shi, Kanagawa (JP)

(72) Inventor: Hiroshi Ikeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 329 days.

(21) Appl. No.: 15/257,277

(22) Filed: Sep. 6, 2016

(65) Prior Publication Data

US 2017/0068738 A1    Mar. 9, 2017

(30) Foreign Application Priority Data

Sep. 8, 2015 (JP) ................. 2015-176981

(51) Int. Cl.
| | |
|---|---|
| G06F 16/9535 | (2019.01) |
| G06Q 30/06 | (2012.01) |
| G06F 16/955 | (2019.01) |
| G06F 16/9537 | (2019.01) |
| G06F 16/2457 | (2019.01) |
| G06F 16/335 | (2019.01) |
| G06K 9/62 | (2006.01) |

(52) U.S. Cl.
CPC .... G06F 16/9535 (2019.01); G06F 16/24578 (2019.01); G06F 16/335 (2019.01); G06F 16/955 (2019.01); G06F 16/9537 (2019.01); G06Q 30/0631 (2013.01); G06K 9/6232 (2013.01)

(58) Field of Classification Search
CPC ........... G06F 17/30867; G06F 17/3053; G06F 16/335; G06F 16/9535; G06F 16/955; G06F 16/9537; G06F 16/24578; G06Q 30/0631; G06K 9/6232; G06K 9/6251; G06K 9/623
USPC ................. 707/722, 726, 730, 732, 743, 749
See application file for complete search history.

(56) References Cited

U.S. PATENT DOCUMENTS

| | | | |
|---|---|---|---|
| 6,347,313 B1 * | 2/2002 | Ma | G06F 17/30256 707/711 |
| 8,468,110 B1 * | 6/2013 | Podgorny | G06F 11/3438 706/45 |

(Continued)

FOREIGN PATENT DOCUMENTS

| | | |
|---|---|---|
| JP | 2011-096025 | 5/2011 |
| JP | 2011-154591 | 8/2011 |

(Continued)

OTHER PUBLICATIONS

JPOA—Office Action of Japanese Patent Application No. 2015-176981 dated May 14, 2019 with machine translation.

*Primary Examiner* — David T. Brooks
(74) *Attorney, Agent, or Firm* — Fujitsu Patent Center (57) ABSTRACT

A retrieval method includes: transforming, by a computer, a scale of a feature space according to feature information of each of items which become retrieval targets based on history information of an item selected in the past by a user; calculating a distance between the items in the feature space based on the feature space transformed for each of the items; and outputting an item located at a near distance to a specific item among the items based on the distance between the items.

9 Claims, 8 Drawing Sheets

(56) References Cited

U.S. PATENT DOCUMENTS

| | | | | |
|---|---|---|---|---|
| 2012/0233183 A1* | 9/2012 | Nakahashi | ............. | G06Q 30/02 707/749 |
| 2013/0013458 A1* | 1/2013 | Uribe | ................ | G06Q 30/0201 705/26.64 |
| 2013/0054593 A1* | 2/2013 | Park | ...................... | G06F 16/335 707/736 |
| 2013/0103609 A1* | 4/2013 | Kirshenbaum | ........ | G06Q 30/02 705/347 |
| 2014/0280101 A1* | 9/2014 | Stipins, III | .............. | G06F 16/48 707/724 |
| 2015/0112918 A1* | 4/2015 | Zheng | ................... | G06Q 30/02 706/48 |
| 2015/0242750 A1* | 8/2015 | Anderson | .......... | G06Q 30/0631 706/50 |
| 2015/0278350 A1* | 10/2015 | Nice | ..................... | G06F 16/335 707/754 |
| 2016/0092781 A1* | 3/2016 | Byrnes | ............. | G06F 17/30395 706/52 |
| 2016/0154887 A1* | 6/2016 | Zhao | .................... | G06F 16/435 707/727 |

FOREIGN PATENT DOCUMENTS

| | | |
|---|---|---|
| JP | 2011-158980 | 8/2011 |
| JP | 2013-033363 | 2/2013 |
| JP | 2014-106943 | 6/2014 |

* cited by examiner

RETRIEVAL METHOD, RETRIEVAL APPARATUS, AND NON-TRANSITORY RECORDING MEDIUM STORING RETRIEVAL PROGRAM RECORDED THEREIN

CROSS-REFERENCE TO RELATED APPLICATION

This application is based upon and claims the benefit of priority from the prior Japanese Patent Application No. 2015-176981, filed on Sep. 8, 2015, the entire contents of which are incorporated herein by reference.

FIELD

The embodiments discussed herein are related to a retrieval method, a retrieval apparatus, and a non-transitory recording medium storing a retrieval program recorded therein.

BACKGROUND

In an information recommendation system, an item similar to an item selected by a user is retrieved among a plurality of items (information) accumulated in, for example, a database (DB) and the retrieved item is recommended to the user.

Related techniques are disclosed in, for example, Japanese Laid-Open Patent Publication No. 2014-106943.

SUMMARY

According to one aspect of the embodiments, a retrieval method includes: transforming, by a computer, a scale of a feature space according to feature information of each of items which become retrieval targets based on history information of an item selected in the past by a user; calculating a distance between the items in the feature space based on the feature space transformed for each of the items; and outputting an item located at a near distance to a specific item among the items based on the distance between the items.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

An item retrieval in an information recommendation system includes a user-based retrieval and an item-based retrieval. In the user-based item retrieval, users who have a similar interest to that of a user are extracted from a behavior history of the user and an item accessed by the extracted users is recommended to the user. In the item-based item retrieval, an item similar to an item that the user accessed or selected in the past is recommended.

It may be difficult to retrieve and recommend an item suitable for a user among items not selected by anyone. For example, for a user himself or herself and another user who has a similar interest to the user recognized based on the behavior history of the user, an item that the user himself or herself and another user did not access in the past may not become an object to be recommended. In a case where an item similar to the selected item is recommended to the user, the recommended item which is similar to the selected item may not be an item to which a behavior history of the user is reflected.

The constitutional elements having the same functionality are denoted by the same reference numerals and redundant descriptions thereof may not be repeated or reduced. The retrieval method, the retrieval apparatus, and the recording medium storing a retrieval program recorded therein merely illustrate an example of the present disclosure, and the embodiments are not limited thereto. The following embodiments may be appropriately combined within a range that there is no contradiction.

Figure 1:
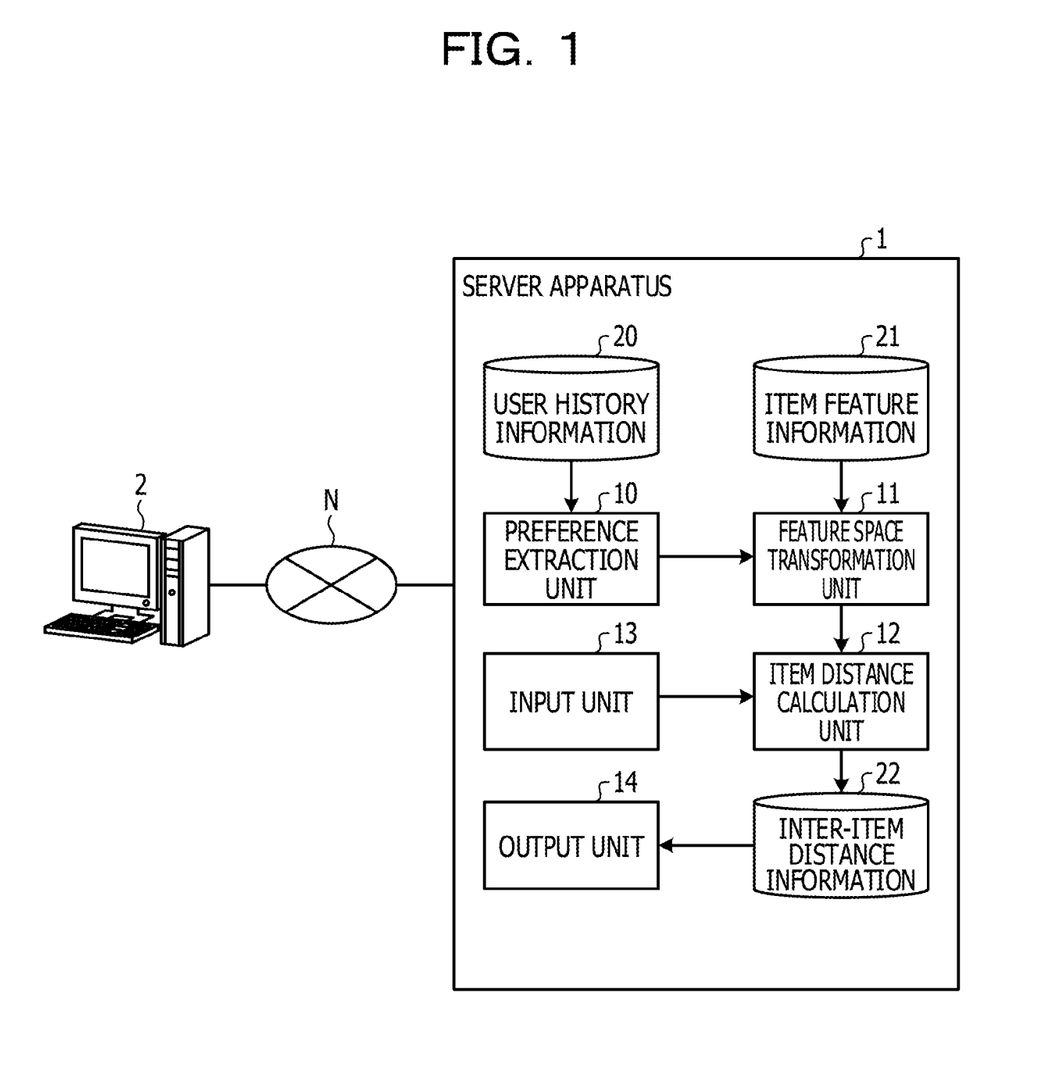
FIG. 1 is a diagram illustrating an example of a system configuration.

FIG. 1 illustrates an example of a system configuration. As illustrated in FIG. 1, the system includes a server apparatus 1 such as a personal computer (PC) and a terminal device 2, and the server apparatus 1 and the terminal device 2 are coupled to be communicable with each other through a network N such as the Internet.

The system may be an information recommendation system that recommends an item to a user by a client/server (C/S) model constituted with the terminal device 2 and the server apparatus 1. For example, the server apparatus 1 notifies the terminal device 2 of an item different from another item selected by the user in the terminal device 2. The terminal device 2 displays the item notified form the server apparatus 1 on, for example, a display and recommends the item to the user.

The disclosed technique may be implemented either by the client/server (C/S) model including the terminal device 2 and the server apparatus 1, or a single information processing apparatus such as the PC. A product to be sold through, for example, the Internet sales may be used as an item and the kind of item is not particularly limited to the product. For example, the items handled in the system may be information such as an article or a home page on the Internet.

The server apparatus 1 includes, as functional components realized through execution of a program by a central processing unit (CPU), a preference extraction unit 10, a feature space transformation unit 11, an item distance calculation unit 12, an input unit 13, and an output unit 14. The server apparatus 1 stores various information such as user history information 20, item feature information 21, and inter-item distance information 22 in a storage device such as a hard disk drive (HDD) or a solid state drive (SSD).

The preference extraction unit 10 estimates a user preference for an item based on the user history information 20 in which a behavior history, such as the item that the user selected in the past, of the user is described. The preference extraction unit 10 outputs an estimated value to the feature space transformation unit 11.

In the user history information 20, for example, the history information such as an item ID indicating an item selected by the user, features (price, size, color) of the item, or selection time are described for each identification information (e.g., for each user identification data (ID)) identifying the user.

Various conditions in selecting an item may be included in the user history information 20 as the history information. For example, the user history information 20 may include information, such as a retrieval condition and an item list for a case of selecting an item among the item list in the retrieval results of the item, as history information about the selected item. The user history information 20 may include a combination of items in a case where a plurality of item selections is explicitly received by the selection operation using, for example, a check box, as the history information.

The preference extraction unit 10 reads out the history information about the authenticated user from the user history information 20 based on the user ID authenticated through, for example, a login from the terminal device 2. The preference extraction unit 10 obtains sensitivity (user sensitivity) which the user feels about the items based on the combination of the items that the user selected in the past and included in the read history information.

For example, the preference extraction unit 10 obtains the user sensitivity based on a combination of items included in the history information and an appearance frequency of the combination using characteristics in which the more the combination of the items about which the user feels that the items are closer to each other in terms of item feature, the more the combination has a possibility of being included in the history information. The user sensitivity may be set, for example, in such a way that a value indicating the sensitivity becomes higher as the items in the combination have higher appearance frequencies because the distance related to the features of the items becomes closer to the user preference as the items in the combination have higher appearance frequencies.

The preference extraction unit 10 determines a combination of items that are similar to each other, among the items that the user selected in the past and included in the user history information 20. The determination method of similar item combination includes a method of making use of a plurality of items selected within a predetermined time as a combination of similar items under the assumption that the user intensively selects the similar items in a certain period of time. The determination method of similar item combination may include a method of combining a plurality of items selected from the same retrieval result. The determination method of similar item combination may also include a method of combining the items explicitly combined by the user through the selection operation using, for example, the check box. The preference extraction unit 10 determines the combination of similar items, using the methods described above, by referring to selection time included in the history information or various conditions at the time of selecting the item.

The preference extraction unit 10 calculates the sensitivity (user sensitivity) that the user feels about the combined items in the determined combination of similar items. For example, regarding calculation of the user sensitivity for a pair of items i and j, the sensitivity is obtained in such a way that the sensitivity of a pair having a higher appearance frequency becomes higher (distances related to the features of the items become nearer).

For example, the inverse of a ratio P(i, j) of combinations of similar items including the item i together with the item j is obtained as $d_{ij}=1/P(i, j)$. A ratio of the product of P(i) and P(j), that are respectively included in the items i and j, to the ratio P(i, j) of the combinations of similar items including the item i together with the item j is obtained. The ratio is $d_{ij}=P(i)\,P(j)/P(i, j)$, and is the inverse of a lift in association analysis. P(i) represents a ratio of the combinations of similar items including the item i. By the calculation described above, a distance (sensitivity) regarding a pair (i, j) of a portion of items is obtained.

The preference extraction unit 10 optimizes the user sensitivity by solving an optimization problem in such a way that the sum of the products of a difference between respective elements of a feature vector of items and the user sensitivity becomes closer to a distance of a pair of items, regarding the user sensitivity of all combinations of the similar items. The feature vector of item is a vector in a feature space having respective features (price, size, and color) of the item as axes. The following Equation 1 is presented as an example of an objective function according to optimization of user sensitivity $w_k$.

$$\Sigma_{i<j}(d_{ij}{}^2-\Sigma_{k=1}^{M}w_k(x_{ik}-x_{jk})^2)^2$$

$$\Sigma_{i<j}(d_{ij}-\Sigma_{k=1}^{M}w_k|x_{ik}-x_{jk}|)^2 \qquad (1)$$

where, a feature vector of item i is regarded as $X_i=(x_1, x_2, \ldots, x_M)^T$.

$\Sigma_{i<j}$ represents the sum of combinations of all i's and j's for which the distance is calculated.

The preference extraction unit 10 obtains user sensitivity $w_k$ (k=1, ..., M) by which the objective function of Equation (1) is minimized under the constraint of $w_k \geq 0$ (k=1, ..., M) (constrained optimization problem). The preference extraction unit 10 regards the obtained $w_k$ as an estimated value of the user sensitivity and outputs the estimated value to the feature space transformation unit 11. The estimated value of the user sensitivity is denoted by adding a hat symbol "^" to the $w_k$.

The feature space transformation unit 11 estimates the distance of an arbitrary pair of items included in the item feature information 21 in the feature space using the estimated value of the user sensitivity output from the preference extraction unit 10 and transforms a scale of feature space for the arbitrary pair of items. The feature space transformation unit 11 outputs a value after transformation to the item distance calculation unit 12.

The item feature information 21 is information indicating respective features (e.g., price, size, color) of each item which becomes a target (retrieval target) as an item to be recommended. For example, values regarding respective features such as a price, a size, a color of item for each identification information (e.g., item ID) identifying the item are described in the item feature information 21. In the item feature information 21, information of, for example, an item (an item not included in the user history information 20) which is just newly registered and for which evaluation of the user is not made is also included.

The feature space transformation unit 11, for example, using the following Equation (2), obtains a distance of an arbitrary pair of items (q, r) included in the item feature information 21 and transforms the scale of the feature space in the arbitrary pair of items.

$$d_{qr} = \sqrt{\Sigma_{k=1}^{M} \hat{w}_k (x_{qk} - x_{rk})^2}$$

$$d_{qr} = \Sigma_{k=1}^{M} \hat{w}_k |x_{qk} - x_{rk}| \quad (2)$$

where a feature vector of an item i is regarded as $X_i = (x_1, x_2, \ldots, x_M)^T$.

The distance in feature space for the arbitrary pair of items (which includes the pair of items for which evaluation of the user is not made) becomes a distance in which user sensitivity such as, for example, user preference is reflected by the transformation of the feature space by the feature space transformation unit 11. For example, the distance in feature space for the arbitrary pair of items may also become substantially the same as the distance between the items that the user feels.

The item distance calculation unit 12 calculates a distance between a predetermined item input from the input unit 13 and other items in the feature space after the scale transformation by the feature space transformation unit 11 with respect to the predetermined item, and outputs the calculation result as the inter-item distance information 22.

The inter-item distance information 22 is information representing the distance between the items calculated by the item distance calculation unit 12. For example, in every combination of items displayed by, for example, an item ID, distance values calculated between the items of each combination are described in the inter-item distance information 22.

The input unit 13 receives an input of the item selected by the user from the terminal device 2. For example, the input unit 13 receives, for example, an item ID indicating an item selected by the user. The input unit 13 notifies the received input of the item to the item distance calculation unit 12. Accordingly, the item distance calculation unit 12 calculates a distance of the item selected by the user to other items in a feature space obtained by reflecting the user preference by the scale transformation according to the user sensitivity.

The output unit 14 refers to the inter-item distance information 22 to output an item, which is located at a near distance to a predetermined item (item selected by the user) in the feature space, to the terminal device 2 as an item to be recommended to the user. For example, the output unit 14 reads the distance value described in the inter-item distance information 22, acquires information (e.g., features such as an item ID, an item image, a size, or a price) indicating the item of which the read value is in a certain range from, for example, the item feature information 21, and outputs the acquired information to the terminal device 2. The terminal device 2 displays the item based on the information output from the output unit 14 on a displaying device such as a display and recommends the item to the user.

Since the item having smaller distance value indicates that the feature of the item becomes nearer to that of the predetermined item, the output unit 14 may output the information indicating an item in an ascending order of the distance value. The output unit 14 gives information (e.g., the value indicating the degree of recommendation is made larger as the distance value becomes smaller) which indicates the degree of recommendation corresponding to the distance value for each item, and outputs the information.

Figure 2:
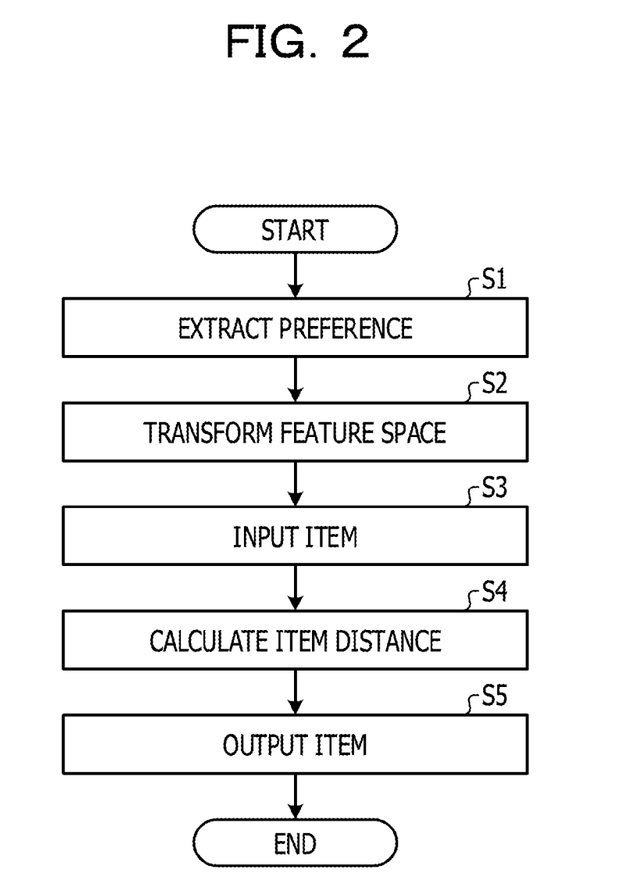
FIG. 2 is a diagram illustrating an exemplary operation of a server apparatus.

FIG. 2 is a diagram illustrating an exemplary operation of a server apparatus. The server apparatus 1 as illustrated in FIG. 1 may execute a process illustrated in FIG. 2. When the process is started, as illustrated in FIG. 2, the preference extraction unit 10 extracts the user preference (user sensitivity) for the item based on the user history information 20 in which a behavior history of a user, such as the item that the user selected in the past is described (S1). The feature space transformation unit 11 transforms the scale of the feature space for an arbitrary item in the item feature information 21 based on the user sensitivity extracted by the preference extraction unit 10 (S2).

Figure 3:
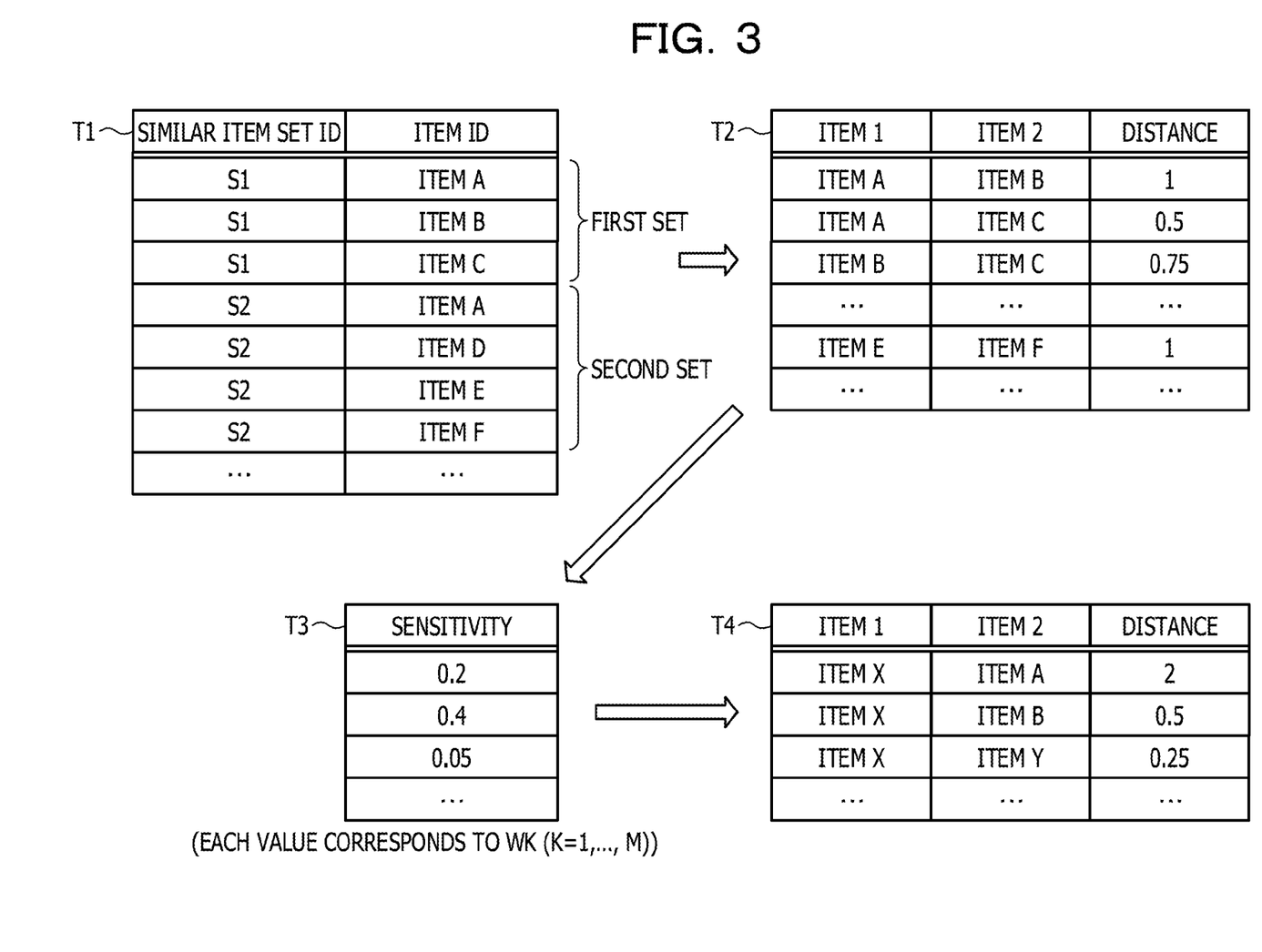
FIG. 3 is a diagram illustrating an example of a data table.

FIG. 3 is a diagram illustrating an example of a data table. In FIG. 3, a similar item set table T1, a distance table within a pair of items T2, a sensitivity vector table T3, and an inter-item distance table T4 in processing related to S1 and S2 are exemplified. As illustrated in FIG. 3, the preference extraction unit 10 obtains a similar item set table T1 in which similar items are combined among the items that the user selected in the past based on the user history information 20 at S1. The preference extraction unit 10 obtains the distance table T2 within a pair of items of the distance between combined items regarding the combination of similar items in the similar item set table T1. The preference extraction unit 10 solves the optimization problem to obtain the sensitivity vector table T3 of the user sensitivity. The feature space transformation unit 11 obtains the inter-item distance table T4 regarding the distance between the arbitrary items in the item feature information 21 based on the user sensitivity of the sensitivity vector table T3.

Figure 4:
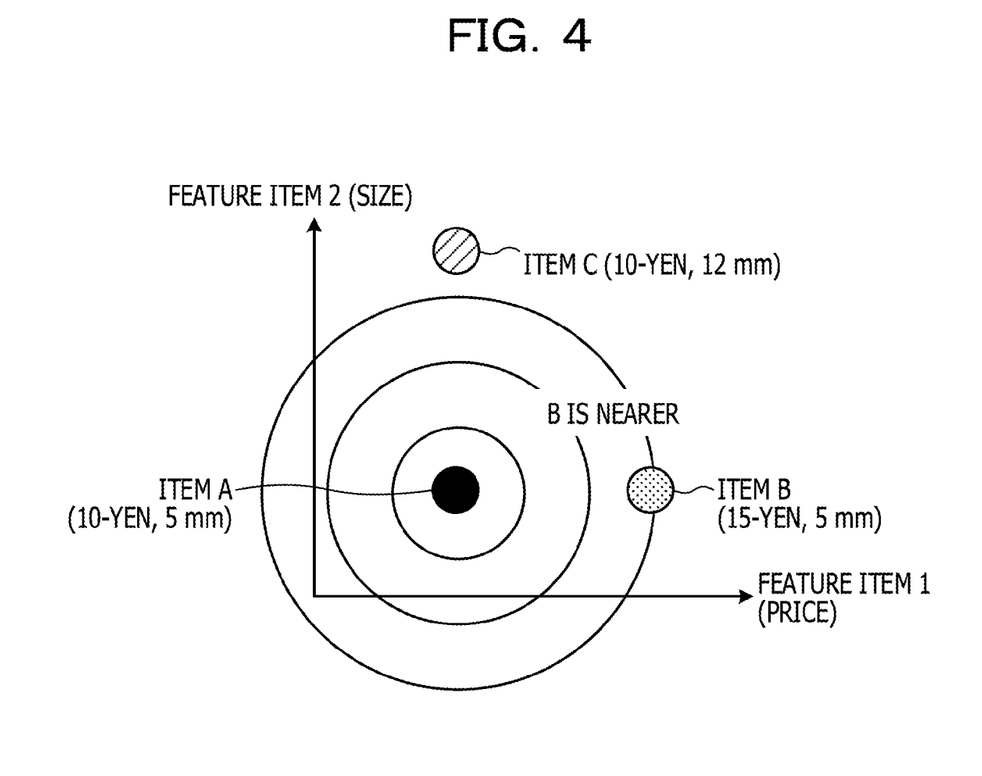
FIG. 4 is a diagram illustrating an example of a feature space of items.
Figure 5A:
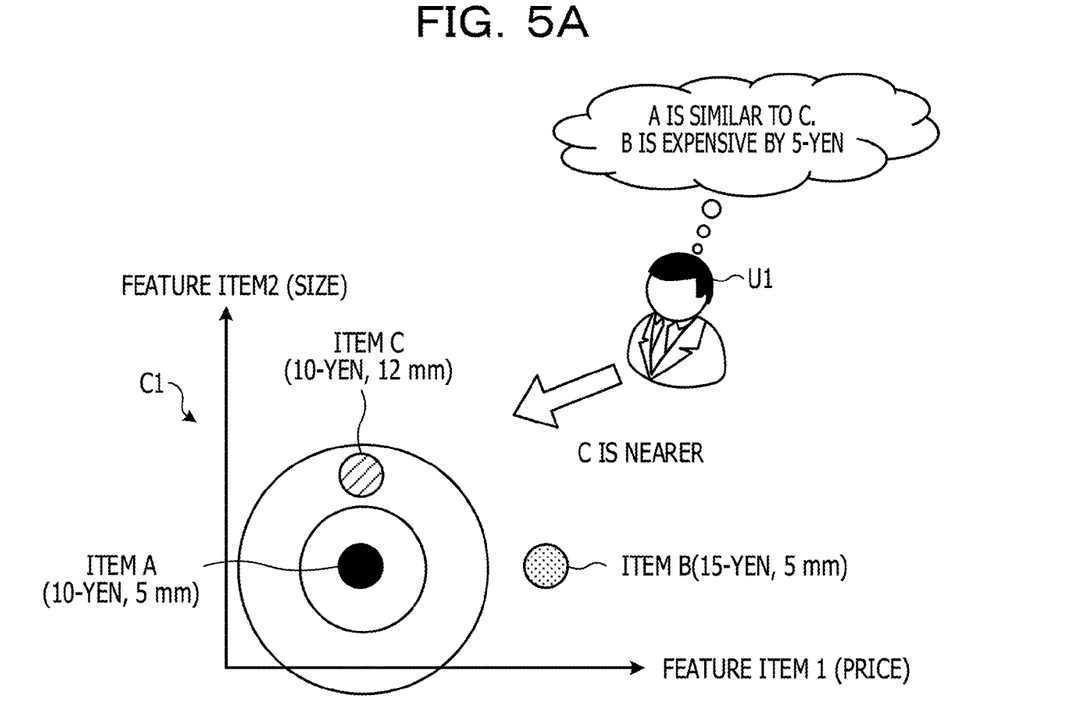
FIG. 5A and FIG. 5B are diagrams each illustrating examples of the feature space of items.
Figure 5B:
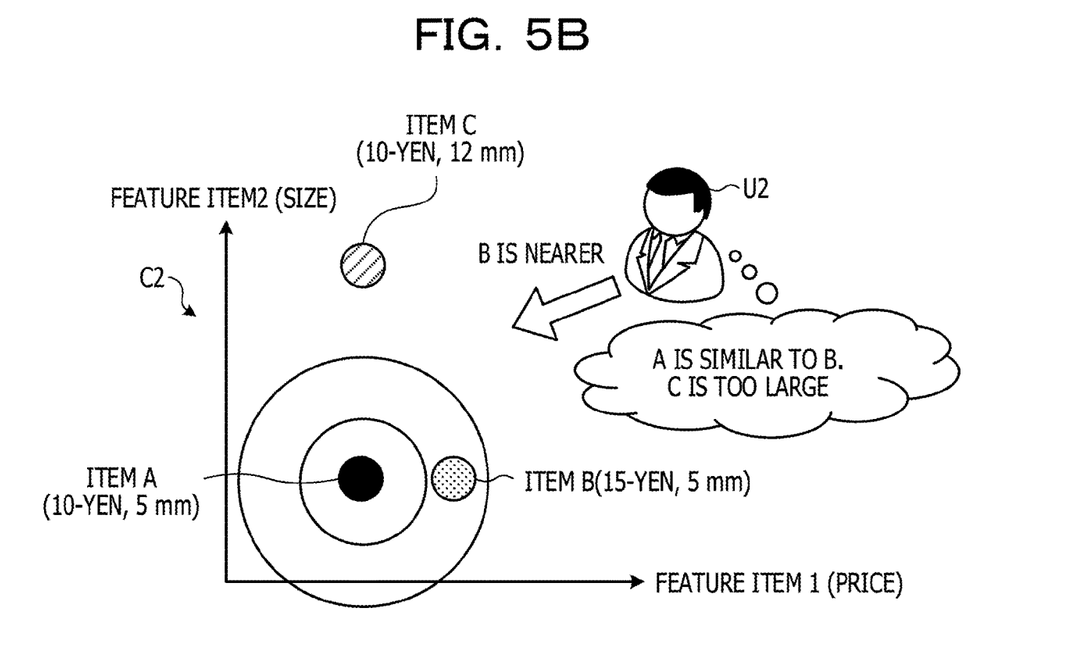

FIG. 4, FIG. 5A, and FIG. 5B illustrate examples of a feature space of items. FIG. 4 illustrates a feature space of items before a scale transformation based on the user sensitivity. FIGS. 5A and 5B illustrate a feature space of items after the scale transformation based on the user sensitivity.

As illustrated in FIG. 4, the nearness of the item feature between the items is indicated according to the distance between the items in the feature space of the items. For example, regarding an item B and an item C with respect to an item A, the distance regarding the feature, such as a size or a price, of the item B to the item A is nearer than the distance of the item C to the item A.

The scale transformation reflecting the user sensitivity is performed for the feature space of item such that the distance between the items corresponds to the user preference.

For example, as illustrated in case C1 of FIG. 5A, when the scale transformation is performed using the user sensitivity based on the user history information 20 of the user U1 having a high sensitivity to a price difference, the distance between the item A and the item C of which prices are the same becomes nearer. Accordingly, the item C corresponding to the preference of the user U1 may be easily recommended for the item A in the user U1. As illustrated in a case C2 of FIG. 5B, when the scale transformation is performed using the user sensitivity based on the user history information 20 of the user U2 having high sensitivity to a size difference, the distance between the item A and the item B of which sizes are the same becomes nearer. Accordingly, the item B corresponding to the preference of the user U2 may be easily recommended for the item A in the user U2.

As illustrated in FIG. 2, the input unit 13 receives an input of the item selected by the user from the terminal device 2 (S3). The item distance calculation unit 12 refers to the inter-item distance table T4 by the feature space transformation unit 11, calculates the distance of the item selected by the user to other items, and outputs the calculation result as the inter-item distance information 22 (S4).

The output unit 14 refers to the inter-item distance information 22, reads information of an item to be recommended for the item selected by the user from, for example, the item feature information 21, and outputs the read information to the terminal device 2 (S5). For example, the output unit 14 reads item information from, for example, the item feature information 21 based on an item ID of the item of which the distance value in the inter-item distance information 22 is within a certain range and outputs the read information to the terminal device 2. The terminal device 2 outputs information of the item output from the server apparatus 1 to the user through, for example, a screen display in a display device or printing to, for example, a paper, by a printing device.

Figure 6:
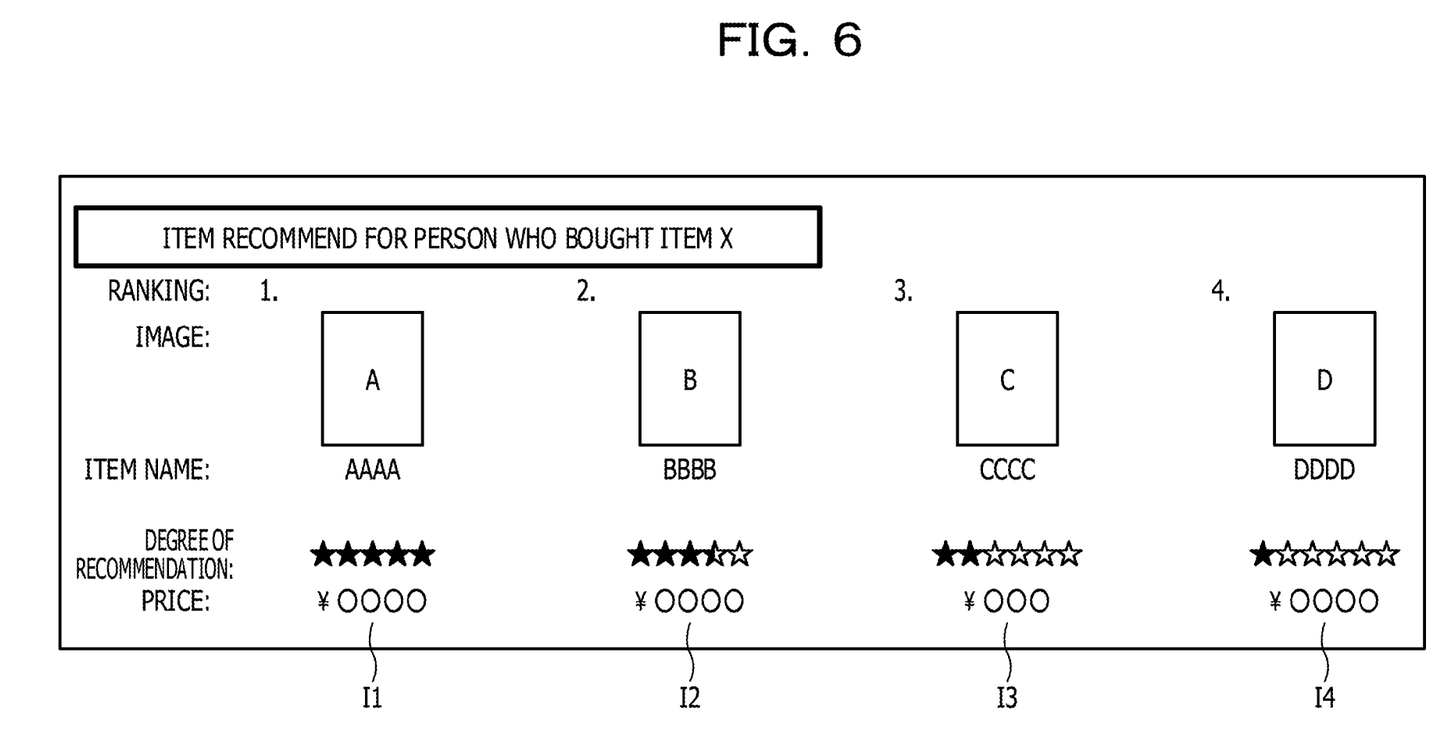
FIG. 6 is a diagram illustrating an example of an item output.

FIG. 6 is a diagram illustrating an example of an item output. As illustrated in FIG. 6, the terminal device 2 outputs information of items I1 to I4, which are output by the server apparatus 1 as items having the feature similar to that of an selected item X, using, for example, a screen display. The information of the items I1 to I4 to be output includes, for example, an image, an item name, and a price read from the item feature information 21, or the degree of recommendation based on the distance value of the inter-item distance information 22. For that reason, the user may easily recognize the details of the item having the feature analogous to that of the selected item X.

In the server apparatus 1, the feature space transformation unit 11 transforms the scale of the feature space based on the item feature information 21 of each item which becomes a retrieval target based on the user history information 20 regarding the item that the user selected in the past. The item distance calculation unit 12 calculates the distances between the items in the feature space based on the feature space transformed in each item. The output unit 14 outputs an item located at a near distance to a predetermined item among respective items based on the calculated distance between the items.

For example, in a case where an item located at a near distance to the item selected by the user is output, an item obtained by reflecting the history of the items, that the user selected in the past, among the items that become the retrieval targets is output and thus, an item suitable for the user may be retrieved.

Since the server apparatus 1 transforms the scale of the feature space on the basis of the item feature information 21 based on the user history information 20, even in a case where an item not selected by anyone is included in the items included in the item feature information 21, the item suitable for the user may be accurately retrieved.

Figure 7:
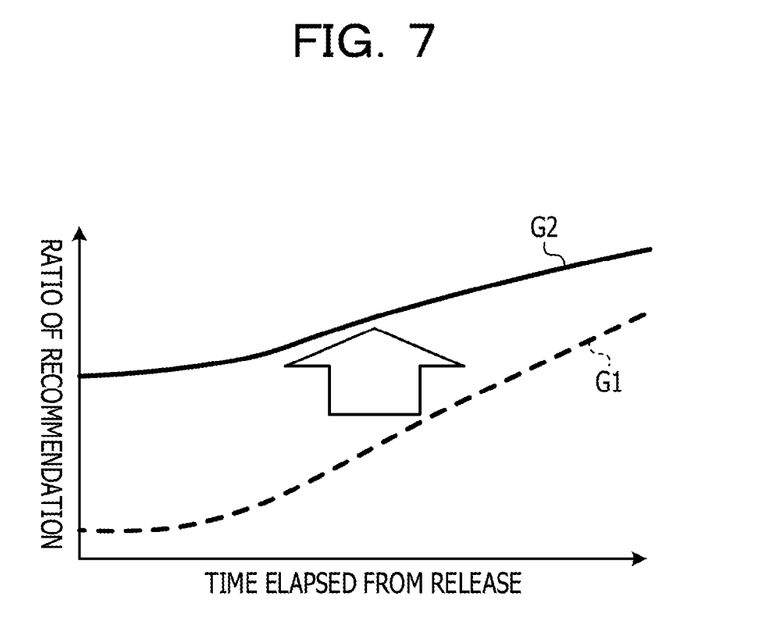
FIG. 7 is a graph illustrating an example of a recommendation ratio with respect to an elapsed time from the release of item.

FIG. 7 is a graph illustrating an example of a recommendation ratio with respect to an elapsed time from release of an item. An opportunity that the selection of item is performed is small for a short period of time after the release of the item, and a ratio of recommendation becomes lower, as illustrated in a graph G1, in the simple user-based item retrieval and item-based item retrieval.

For example, in the server apparatus 1, even in a case where for a short period of time after the release of an item, the opportunity that the selection of item is performed is small, the item may be retrieved as an item suitable for the user as long as the item is included in the item feature information 21. Even for a short period of time after the release of an item, a decrease of the ratio of recommendation illustrated in a graph G2 may be reduced.

Some or all of various functionalities performed by the server apparatus 1 may be executed on a CPU (or a micro computer such as a multi processor unit (MPU) or a micro controller unit (MCU)). Some or all of various functionalities may be executed on a program analyzed and executed by the CPU (or a micro computer such as the MPU or the MCU) or on hardware configured by wired logics.

Figure 8:
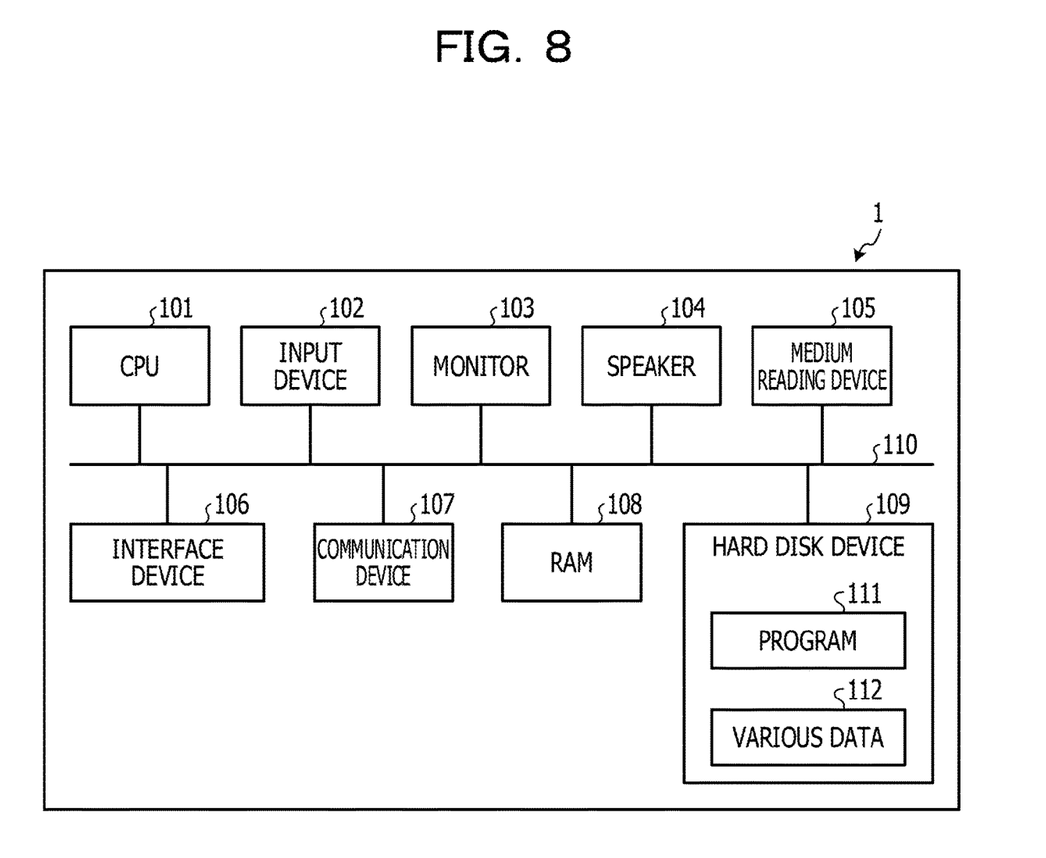
FIG. 8 is a diagram illustrating an example of a hardware configuration of a server apparatus.

Various processings described above may be executed through execution of a program, which is prepared in advance, by a computer. A computer (hardware) executing a program equipped with the functionalities described above may be provided. FIG. 8 is a diagram illustrating an example of a hardware configuration of a server apparatus.

As illustrated in FIG. 8, the server apparatus 1 includes a CPU 101 executing various operation processings, an input device 102 receiving data input, a monitor 103, and a speaker 104. The server apparatus 1 includes a medium reading device 105 reading, for example, a program from the recording medium, an interface device 106 for coupling with various devices, and a communication device 107 for communicating and coupling with an external equipment through wired connection or wirelessly. The server apparatus 1 includes an RAM 108 temporarily storing various information and a hard disk device 109. Further, respective constitutional elements 101 to 109 within the server apparatus 1 are coupled to a bus 110.

A program 111 for executing various processings in the preference extraction unit 10, the feature space transformation unit 11, the item distance calculation unit 12, the input unit 13, and the output unit 14 is stored in the hard disk device 109. Various data 112 (e.g., user history information 20, item feature information 21, or inter-item distance information 22) referenced by the program 111 are stored in the hard disk device 109. The input device 102 receives an input of operational information by an operator of, for example, the server apparatus 1. The monitor 103 displays various screens operated by, for example, the operator. The interface device 106 is coupled with, for example, a printing device. The communication device 107 is coupled with a communication network such as, for example, a Local Area Network (LAN) and exchanges various information with an external equipment through the communication network.

The CPU 101 performs various processings by reading the program 111 stored in the hard disk device 109 and deploying the program 111 in the RAM 108 to be executed. The program 111 doesn't have to be stored in the hard disk device 109. For example, the server apparatus 1 may be configured to read the program 111 stored in the recording medium readable by the server apparatus 1 to execute the program 111. The recording medium readable by the server apparatus 1 may include, for example, a CD-ROM, a DVD disk, a portable recording medium such as a Universal Serial Bus (USB) memory, a semiconductor memory such as a flash memory, and a hard disk drive. The program is caused to be stored in an apparatus coupled to, for example, a public network, the Internet, and the LAN and the server apparatus 1 may read the program from the apparatus to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A retrieval method comprising:
    storing history information of a user on selecting items in a memory;
    extracting a selection preference of the user on the items by calculating a reciprocal of a first ratio including the items or a second ratio of a product of a third ratio including one item of the items and a fourth ratio including the other item of the items to the first ratio using the history information of the user;

transforming, by a computer, a scale of a feature space according to feature information of each of items which become retrieval targets based on the selection preference of the user extracted in the extracting such that each of distances between the items in the feature space corresponds to the selection preference of the user, the feature information of each of items including feature information of an item not included in the history information of the user;

calculating the distances between the items in the feature space, respectively, based on the feature space transformed in each of the items; and outputting an item having a distance within a predetermined range to a specific item selected by the user among the items based on the distances between the items calculated in the calculating such that the output distance calculated in the feature space reflects not only the history information of the user but also the feature information of each of items including feature information of the item not included in the history information of the user.

2. The retrieval method according to claim 1, wherein combination of the items is selected by the user in the past and included in the history information.

3. The retrieval method according to claim 1, wherein the transforming transforms the scale of the feature space such that the distance of each of the items in the feature space becomes equal to the distance between the items corresponding to the selection preference of the user extracted in the extracting.

4. A retrieval apparatus comprising:
a memory configured to store a retrieval program; and
a processor coupled to the memory and configured to execute the retrieval program wherein, based on the retrieval program, the processor is configured to:
store history information of a user on selecting items in the memory;
extract a selection preference of the user by calculating a reciprocal of a first ratio including the items or a second ratio of a product of a third ratio including one item of the items and a fourth ratio including the other item of the items to the first ratio using the history information of the user;
transform a scale of a feature space according to feature information of each of items which become retrieval targets based on the extracted selection preference of the user such that each of distances between the items in the feature space corresponds to the selection preference of the user, the feature information of each of items including feature information of an item not included in the history information of the user;
calculate the distances between the items in the feature space, respectively, based on the feature space transformed in each of the items; and
output an item having a distance within a predetermined range to a specific item selected by the user among the items based on the calculated distances between the items such that the output distance calculated in the feature space reflects not only the history information of the user but also the feature information of each of items including feature information of the item not included in the history information of the user.

5. The retrieval apparatus according to claim 4, wherein selected by the user in the past and included in the history information.

6. The retrieval apparatus according to claim 4, wherein the processor is configured to transform the scale of the feature space such that the distance of each of the items in the feature space becomes equal to the distance between the items corresponding to the extracted selection preference of the user.

7. A non-transitory computer-readable recording medium stored therein a retrieval program for causing a computer to execute a process, the process comprising:
storing history information of a user on selecting items in a memory;
extracting a selection preference of the user on the items by calculating a reciprocal of a first ratio including the items or a second ratio of a product of a third ratio including one item of the items and a fourth ratio including the other item of the items to the first ratio using the history information of the user;
transforming a scale of a feature space according to feature information of each of items which become retrieval targets based on the selection preference of the user extracted in the extracting such that each of distances between the items in the feature space corresponds to the selection preference of the user, the feature information of each of items including feature information of an item not included in the history information of the user;
calculating the distances between the items in the feature space, respectively, based on the feature space transformed in each of the items, and
outputting an item having a distance within a predetermined range to a specific item selected by the user among the items based on the distance between the items calculated in the calculating such that the output distance calculated in the feature space reflects not only the history information of the user but also the feature information of each of items including feature information of the item not included in the history information of the user.

8. The non-transitory computer-readable recording medium according to claim 7, wherein selected by the user in the past and included in the history information.

9. The non-transitory computer-readable recording medium according to claim 7, wherein the scale of the feature space is transformed such that the distance of each of the items in the feature space becomes equal to the distance between the items corresponding to the selection preference of the user extracted in the extracting.

* * * * *